Oct. 26, 1943.  D. M. MORRIS  2,332,743

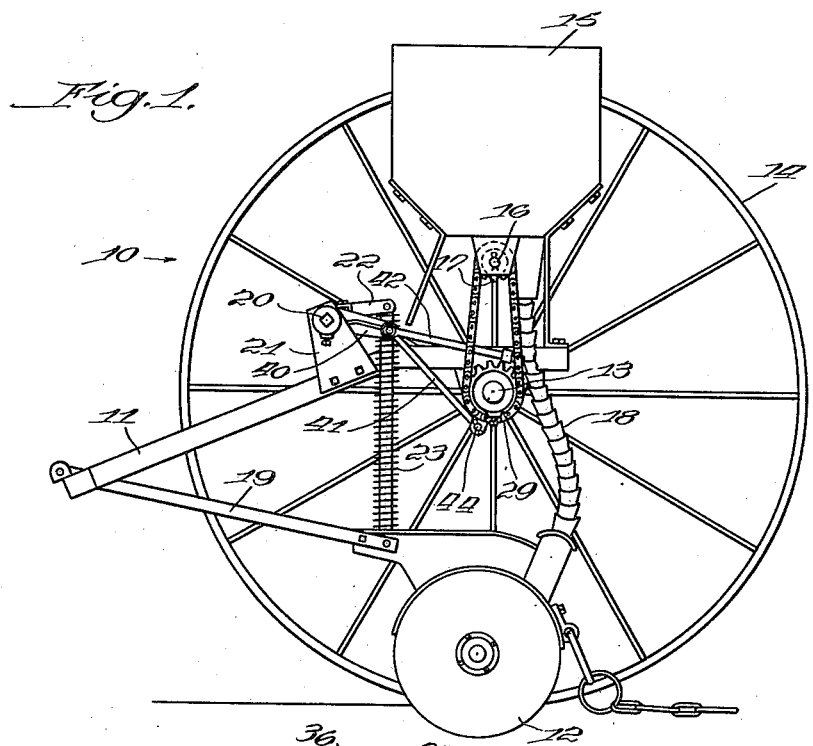

PLANTER CLUTCH CONSTRUCTION

Filed Aug. 28, 1941  2 Sheets-Sheet 2

Inventor:
David M. Morris.
By Paul O. Pippel
Atty.

Patented Oct. 26, 1943

2,332,743

UNITED STATES PATENT OFFICE 2,332,743

PLANTER CLUTCH CONSTRUCTION

David M. Morris, Richmond, Ind., assignor to International Harvester Company, a corporation of New Jersey Application August 28, 1941, Serial No. 408,651

5 Claims. (Cl. 111—67)

This invention relates to a clutch construction. More specifically, it relates to a clutch construction for the automatic interruption of feed means of a planter upon raising of the planting elements.

Clutches are well known which comprise a pair of rotating elements normally engaged with one another and disengaged by movement of one element away from the other along the axis of rotation. Disengagement of one clutch member from the other may be effected by means of a cam member mounted upon one clutch member so that, upon rotation of the cam member, it is moved along the axis of rotation and also moves one clutch member until it is disengaged from the other. Such an arrangement has been applied to planters, and rotation of the cam member has been effected through rotation of the rock-shaft which is normally used for raising and lowering of the planting elements. Thus, when the planting elements are raised from ground-engaging position to transport position by an angular movement of the rock-shaft, this same angular movement of the rock-shaft serves to rotate the cam member and thereby to move one element out of engagement with the other. Thus, there is effected an automatic interruption of the drive of feeding means by which seed is fed to the planting elements, this interruption taking place upon raising of the planting elements. The disadvantage of such an arrangement is that the angular movement of the rock-shaft, which raises the planting elements, may not be sufficient to effect rotation of the cam member necessary for the disengagement of one clutch element from the other.

An object of the present invention is to provide an improved clutch construction.

A further object is the provision of improved means for disengaging the elements of a clutch.

Another object is to provide an improved planter construction.

Still another object is the provision of an improved clutch for the feed means of a planter.

A further object is to provide an improved clutch on a planter, which clutch is to be disengaged automatically upon raising the planting elements of the planter for interruption of the feeding of seed to the planting elements.

According to the present invention a planter, including planting elements, means for feeding seed to the planting elements, and a drive shaft for the seed-feeding means, is provided with a clutch connecting the driving shaft and the seed-feeding means, which clutch is composed of a pair of engaging elements mounted upon the shaft which are disengaged by movement of one element away from the other along the shaft. Cam members are mounted upon the clutch elements and engage one another so that, upon rotation of one cam member with respect to the other, the cam members move away from one enother and disengage the clutch elements. The cam members are connected by links to an arm on a rock-shaft by which the planting elements are raised. Thus, upon raising of the planting elements from ground-engaging position to transport position, there is a rotation of the rock-shaft and of the arm mounted thereon. This rotation of the arm is transferred by means of the links connecting the arm and the cam members into rotation of the cam members in opposite directions and a consequent disengagement of the clutch members which interrupts the drive of the means feeding seed to the elements.

In the drawings—

Figure 1 is a side view of a planter employing the novel clutch construction of the present invention with parts removed;

Figure 2 is a detailed view, partially in section, showing the driving shaft of the planter and the novel clutch construction;

Figure 3 is a detailed view showing a cam member used for an operating clutch;

Figure 4:
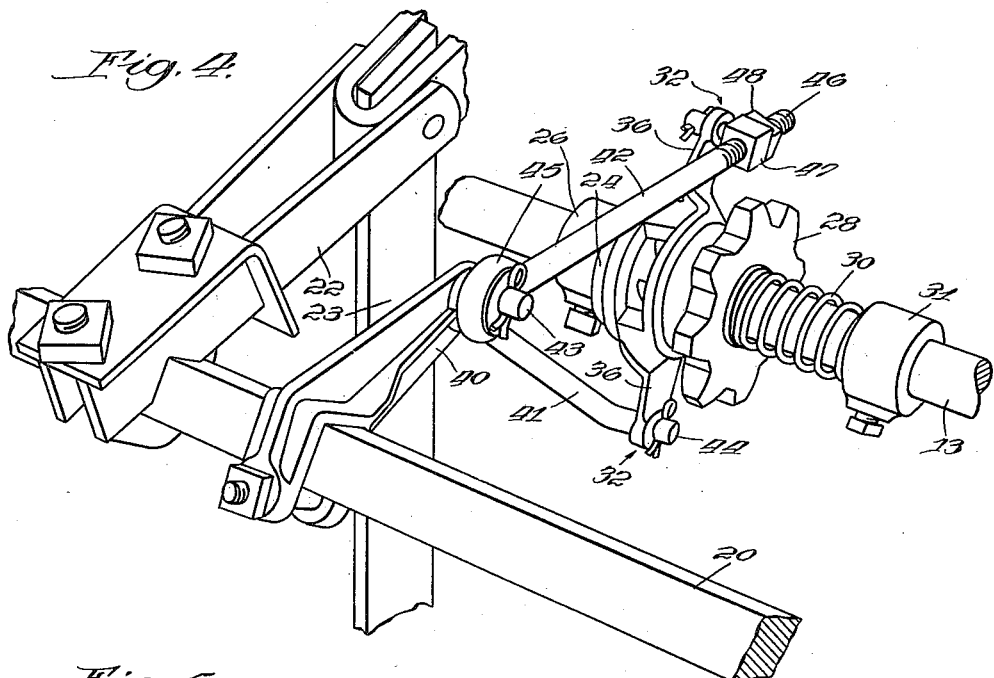
Figure 4 is a perspective view of the drive shaft, the clutch construction, and the rock-shaft and connecting members for raising a planting element; and, Figure 5 is a similar view showing the clutch disengaged.

The reference character 10 designates a planter which comprises a supporting frame 11, planting elements 12 of which only one is shown, a combination axle and drive shaft 13, and supporting wheels 14 connected to the axle only one wheel being shown. The planter also includes a seed box 15, seed-feeding mechanism of which only a shaft 16 and a driving gear 17 mounted thereon are shown, and a flexible tube 18 connecting the seed-feeding mechanism and the planting elements. The planting element 12 is mounted upon the supporting frame 11 for movement between a ground-engaging position shown in Figure 1 and a transport position by means of a link 19. The actual change from ground-engaging position to transport position is effected by angular movement of a rock-shaft 20 supported in a bracket 21. The rock-shaft 20 is connected with a planting element 12 by means of an arm 22 and a link 23. The actual means employed for rotating the rock-shaft is not shown, since it forms no part of the present invention.

Figure 5:
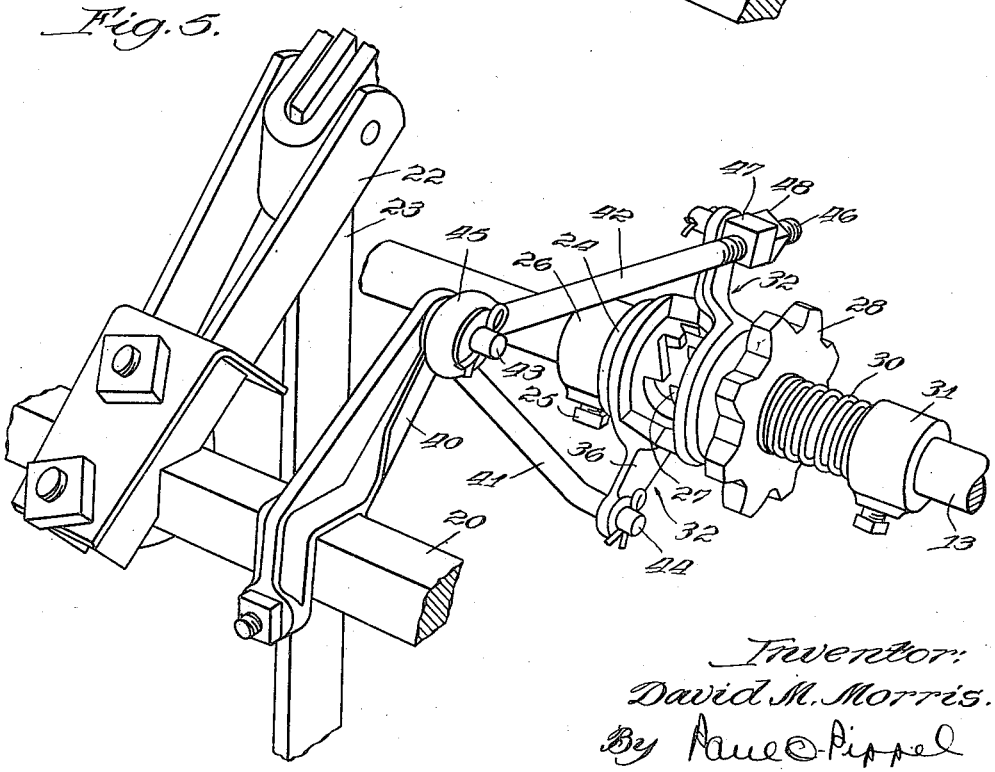

Figure 2 shows the details of the novel clutch construction. As seen in this figure, a clutch element 24 is secured to the driving shaft or axle 13 by means of a set screw 25 extending through a collar portion 26 of the clutch element. A clutch element 27 engageable with the clutch element 24 but disengaged in the position shown in Figure 2 includes a sprocket portion 28 which is engaged by a sprocket chain 29 also engaging the sprocket 17 secured to the shaft 16 forming part of the seed-feeding means. A coil spring 30, embracing the shaft 13, urges the clutch element 27 toward engagement with the clutch element 24. One end of the spring 30 rests against a set collar 31 secured to the shaft 13. Positioned upon the clutch elements 24 and 27 for rotation independent thereof is a pair of identical control or cam members 32. As seen in Figure 3, each member 32 includes an annular portion 33 provided with diametrically opposed raised cam portions 34, each having an inclined portion 35. An arm 36 extends out from the annular part 33 and is provided with a hole 37. As seen in Figure 2, one control member 32 is mounted on the clutch element 34 so as to rest against a shoulder 38 formed on the clutch element. The other control member 32 is positioned on the clutch element 27 resting against a shoulder 39 formed thereon. In the position of Figure 2, the raised cam portions 34 of one control member 32 engage the raised cam portions 34 of the other control member 32. Thus, the clutch elements 24 and 27 are held out of engagement with one another, this being permitted by virtue of the slidable mounting of the clutch element 27 on the shaft 13. This same relative position of the various elements is also shown in Figure 5. In Figure 4, the raised cam portions 34 of one control member 32 fit within the spaces between the raised cam portions 34 of the other control member 32, and so the clutch elements 24 and 27 are in engagement.

An arm 40 is secured to the rock-shaft 20 and links 41 and 42 connect the arm 40 with the arm portions 36 of control members 32. The link 41 has one bent end portion 43 which extends through the arm 40 and another bent end portion 44 which extends through the opening 37 in the arm 36 of one control member 32. One end of the link 42 has an enlarged eye portion 45 which embraces the end portion 43 of the link 41 and thus is connected to the arm 40. The other end of the link is threaded, as indicated at 46, and is in threaded engagement with a member 47 which projects through the opening 37 in the arm 36 in one control member 32. There is also a locknut 48 on the threaded portions 46.

Normal operation of the planter takes place with the part shown in Figure 1. Rotation of the wheel 14 is transmitted to the shaft 13 which, in turn, transmits rotation through the clutch elements 24 and 27 to the sprocket portion 28. The chain 29 transmits rotation of the sprocket portion 28 to the sprocket 17 which, in turn, rotates the drive shaft 16 of the feeding mechanism. Thus, seed is conveyed through the tube 18 to the planting element 12.

When the planter is to be transported, the planting element 12 is raised to transport position by an angular movement of the rock-shaft 20 which acts through arm 22 and link 23 to raise the planting element. Also, the arm 40 on the rock-shaft 20 is rotated through a small angle as is to be noted from a comparison of Figures 4 and 5. The rotation of the arm 40 causes a movement of the links 41 and 42 such as to rotate the control members 32 in opposite directions. By virtue of such rotation, the inclined portions 35 of the cam portions 34 of the control members 32 come into contact and the one control member is shifted so that the flat parts of the cam portions 35 are in contact. Thus, the clutch element 27 is shifted along the shaft 13 so as to be taken out of engagement with the clutch element 24, and so drive of the seed-feeding means is interrupted.

The essential feature of the present invention is the provision of two cam members or control members 32 rather than a single member, which members are connected by the links 41 and 42 of the arm 40 so as to be caused to rotate in opposite directions. Thus for a given angular movement of the arm 40 there is a more pronounced relative rotation between the control members 32 and thus a quicker and more effective disengagement of the clutch elements 24 and 27.

The novel clutch construction illustrated is shown for use with a planter, but it will be obvious that it may be used with other devices as well.

The intention is to limit the invention only within the scope of the appended claims.

What is claimed is:

1. In a construction comprising a rotating driving member, a rotating driven member, a first clutch element connected with the driving member for rotation therewith, and a second clutch element connected with the driven member for rotation therewith and engaging the first clutch element and being disengageable therefrom by movement with respect thereto along the axis of rotation, the combination with the clutch elements of a pair of control elements associated with one another and with the clutch elements so as to cause relative movement of the elements away from one another due to rotation of one control element with respect to the other to disengage the clutch elements by effecting relative movement between them along the axis of rotation, and actuating means connected with one control element on one side of the said axis of rotation and with the other control element on the other side of the said axis of rotation and operative by a movement on a line generally transverse of the said axis of rotation to rotate the control elements in opposite directions for effecting a quick disengagement of the clutch elements.

2. In a construction comprising a driving shaft, a first clutch element mounted on the shaft for rotation therewith, a second clutch element mounted on the shaft in engagement with the first clutch element and disengageable therefrom by relative movement of one clutch element away from the other along the axis of rotation of the shaft, a driven member mounted on the shaft and connected with the second clutch element for rotation therewith, the combination with the clutch elements of a pair of control elements mounted on the clutch elements for rotation with respect thereto and having interengaging cam portions which upon relative rotation of the control elements cause relative movement thereof away from one another along the axis of rotation and thereby disengage the clutch elements by effecting relative movement between them along the axis of rotation, and actuating means connected with one control element on one side of the said axis of rotation and with the other control element on the other side of the said axis of rotation and operative by a movement on a line generally transverse of the said axis of rotation to rotate the control elements in opposite directions for effecting a quick disengagement of the clutch elements.

3. In a planter construction comprising a supporting frame, a planting element, means mounting the planting element on the supporting frame for adjustment between a ground-engaging position and a transport position, means for feeding seed to the planting element, driving means, and means for transmitting drive from the driving means to the feeding means and including a clutch composed of rotative engaging clutch elements disengageable by relative movement along the axis of rotation, the combination with the clutch elements of a pair of control elements associated with one another and with the clutch elements so as to move with respect to one another along the axis of rotation upon rotation of one control element with respect to the other and thereby to disengage the clutch elements by effecting relative movement between them along the axis of rotation, and means connecting the planting element and the control elements for simultaneously rotating the control elements in opposite directions for effecting a quick disengagement of the clutch elements and thereby a quick interruption of the driving of the feeding means upon adjustment of the planting element from ground-engaging position to transport position.

4. In a planter construction comprising a frame, wheels supporting the frame, a planting element, means mounting the planting element on the frame for adjustment between the ground-engaging position and a transport position, means for feeding seed to the planting element, means for transmitting drive from the wheels to the feeding means and including a clutch composed of rotative engaging clutch elements disengageable by relative movement along the axis of rotation, the combination with the clutch elements of a pair of control elements associated with one another and with the clutch elements so as to move away from one another along the axis of rotation upon rotation of one control element with respect to the other and thereby to disengage the clutch elements by effecting relative movement between them along the axis of rotation, and means connecting the planting element and the control elements for simultaneously rotating the control elements in opposite directions for effecting a quick disengagement of the clutch elements and thereby a quick interruption of the driving of the feeding means upon adjustment of the planting element from ground-engaging position to transport position, said means comprising a rockable member mounted on the frame and links connecting the rockable member and the control elements at opposite sides of the axis of rotation.

5. In a planter construction comprising a frame, an axle supporting the frame, wheels supporting and driving the axle, a planting element, means mounting the planting element on the frame for movement between a ground-engaging position and a transport position, and means for moving the planting element from the ground-engaging position to the transport position comprising rockable means mounted on the frame and link means connecting the planting element and the rockable means, means for feeding seed to the planting element, and means for driving the feeding means from the axle including a first clutch element mounted upon the axle for rotation therewith and a second clutch element mounted upon the axle and engaging the first clutch element and being disengageable therefrom through movement of one clutch element with respect to the other along the axis of rotation of the axle, the combination with the rockable means and the clutch element of a pair of control elements associated with one another and with the clutch elements so as to move away from one another along the axis of rotation upon rotation of one control element with respect to the other and thereby to disengage the clutch elements by effecting relative movement between them along the axis of rotation, and links connecting the rockable means and the control elements at opposite sides of the axis of rotation for simultaneously rotating the control elements in opposite directions for effecting a quick disengagement of the clutch elements and thereby a quick interruption of the driving of the feeding means upon adjustment of the planting element from ground-engaging position to transport position.

DAVID M. MORRIS.